United States Patent [19]

Bodkin

[11] Patent Number: 5,159,517
[45] Date of Patent: Oct. 27, 1992

[54] IMMERSION DETECTION CIRCUIT INTERRUPTER

[75] Inventor: Lawrence E. Bodkin, Jacksonville, Fla.

[73] Assignee: Innovative Designer Products, Inc., Kendall Park, N.J.

[21] Appl. No.: 554,714

[22] Filed: Jul. 17, 1990

[51] Int. Cl.$^5$ ............................................. H02H 3/16
[52] U.S. Cl. ...................................... 361/49; 361/50; 361/58; 307/326
[58] Field of Search ...................... 361/49, 50, 104, 42; 307/116, 118, 326

[56] References Cited

U.S. PATENT DOCUMENTS

| | | | |
|---|---|---|---|
| 4,079,440 | 3/1978 | Ohnuma et al. | 361/42 |
| 4,245,270 | 1/1981 | Busby | 361/58 |
| 4,464,582 | 8/1984 | Aragaki et al. | 361/42 |
| 4,589,047 | 5/1986 | Gaus et al. | 361/42 |

Primary Examiner—Todd E. DeBoer
Attorney, Agent, or Firm—Arthur G. Yeager

[57] ABSTRACT

A sensing conductor and a detection circuit cause a low resistance shorting of an appliance circuit in response to immersion in water or other electrically conductive liquid, and an interrupter device, preferably located in the plug of the cord set, reacts to overcurrent, by opening both sides of the line. The sensing conductor must be strategically placed, within the appliance housing, to pass in proximity to liquid access points and the current carrying parts of the appliance. The detection circuit may be within the appliance or in the plug, with the sensing conductor extended to the appliance as a third conductor in the line cord. When a small current passes between the sensing conductor and the ungrounded or grounded neutral sides of the line or earth ground, current is shunted through the detection circuit from the ungrounded to the grounded neutral conductor, and away from the appliance circuit. A fuse link is opened in one side of the line which, in turn, releases normally open contacts, in the other side of the line, which open and remain open, so that both sides are permanently interrupted.

32 Claims, 3 Drawing Sheets

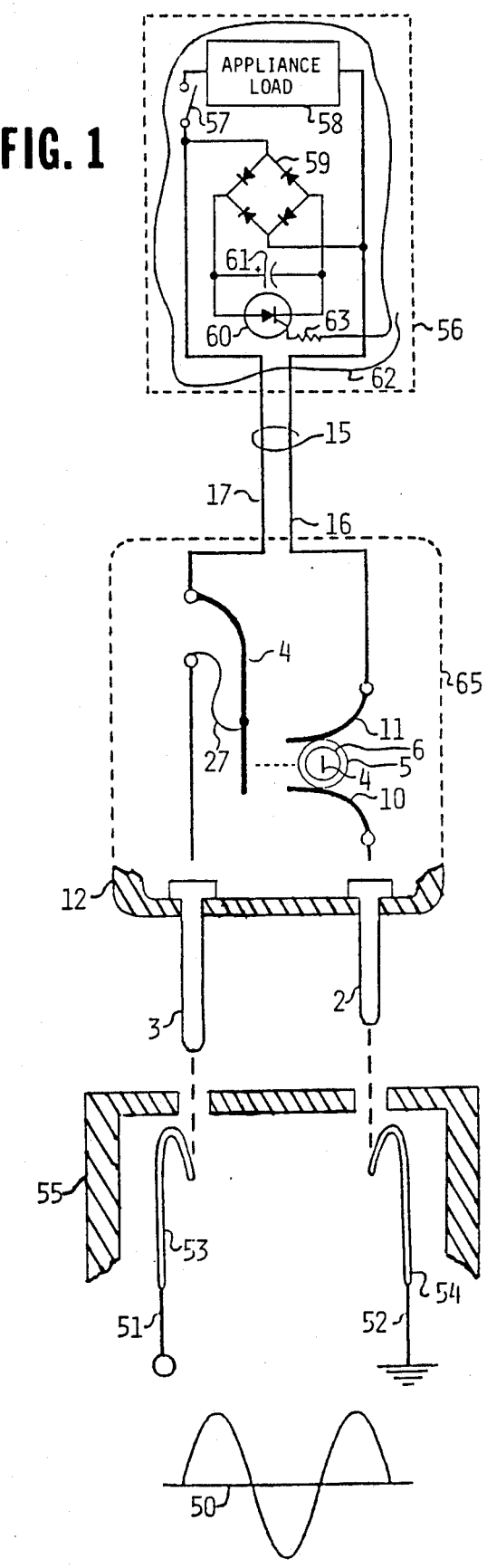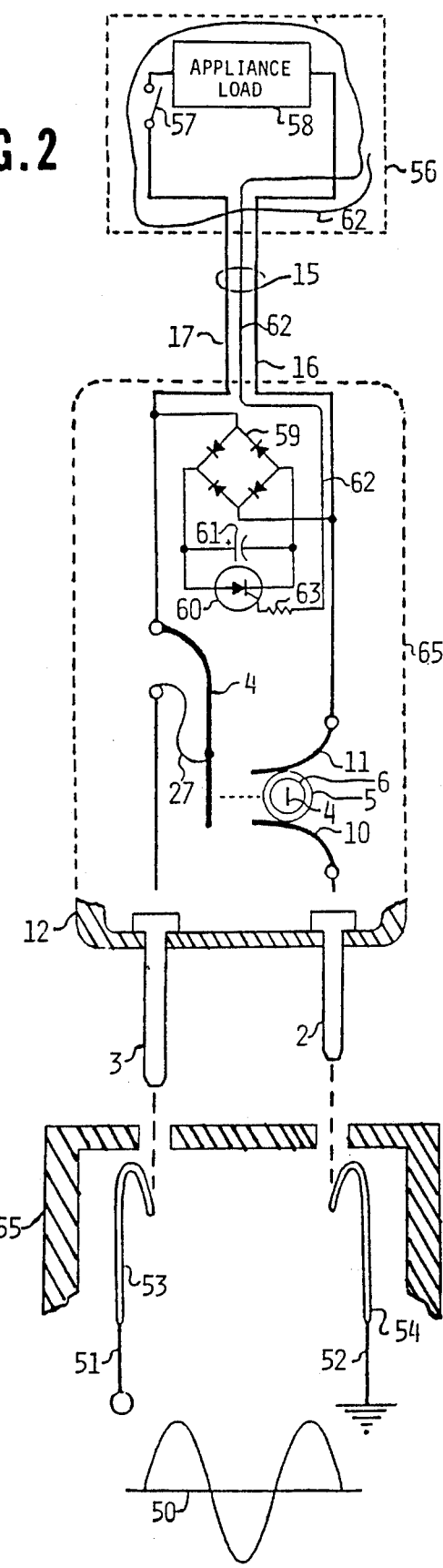

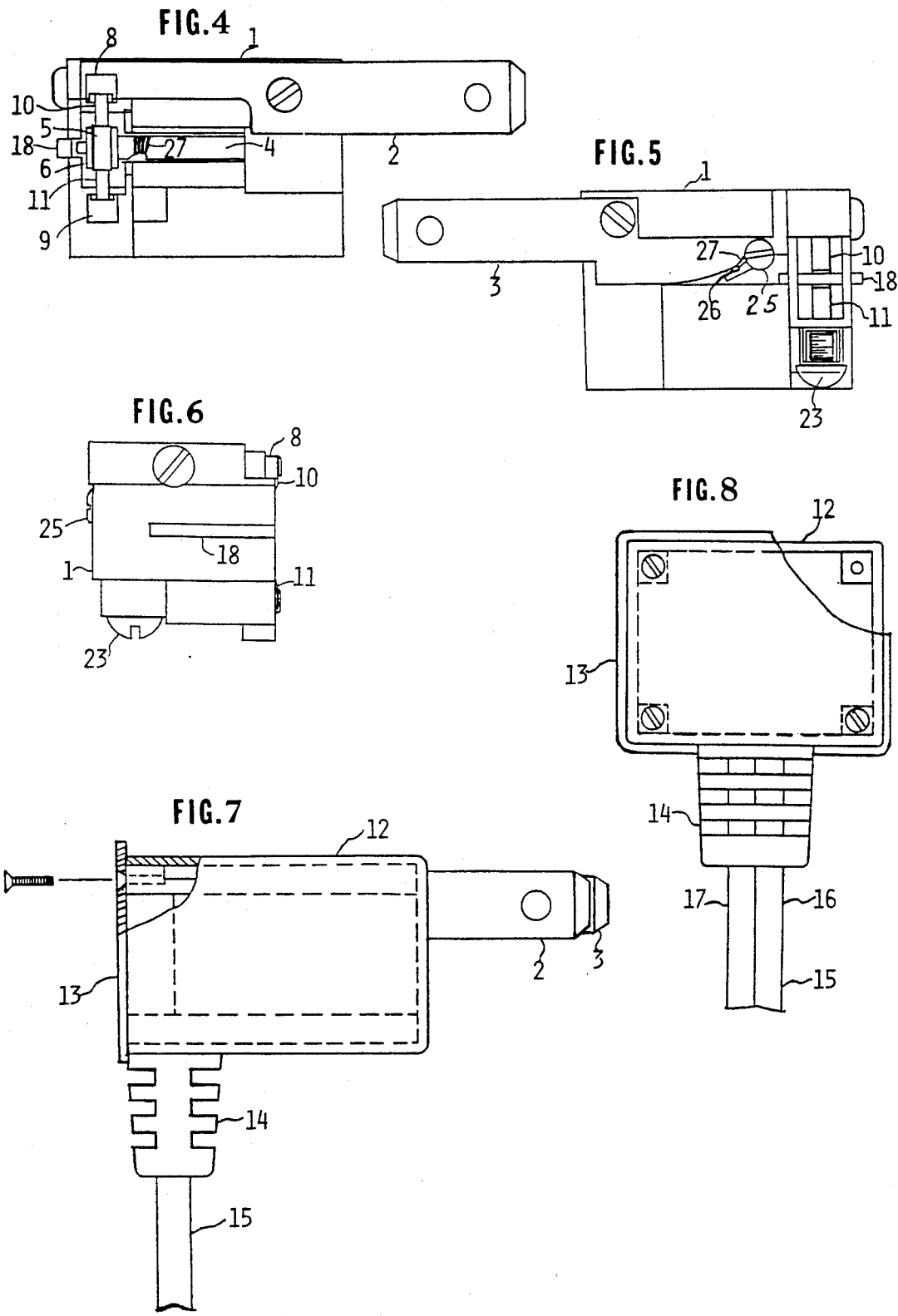

IMMERSION DETECTION CIRCUIT INTERRUPTER

BACKGROUND OF THE INVENTION

With the ever increasing use of electrical power in the home, there is a growing governmental and public awareness of electrical shock hazard and recognition of the need for improved means to reduce or eliminate the possibility of harmful electrical shock. This has resulted in a mandating of more sophisticated protection, requiring use of means considered most effective, but within the restricting framework of cost that affects the matter of practical implementation.

If one can never presume to place a price on human life, the cost of protecting it should not be a factor, but it is one that is constantly at work in the marketplace. Maximum electrical shock protection should ideally be provided in all instances, but there is a demonstrated willingness to accept risk in the interest of economy and especially to forego safety modifications that might escalate the price of less expensive items. The cost of adding ground fault and line-to-line protection to hairdryers is more acceptable than when added to hair curlers, where the cost of the protection may well exceed the basic cost of the appliance yet the curler can be as dangerous as the dryer.

These examples were selected because conditions of greatest electrical shock hazard have been generally established to exist wherever appliances are used around water, but most particularly in the bathroom where intensive use of electrical appliances is combined with extreme proximity to water under widely variable conditions, many of which include a ready opportunity for complete or partial immersion, It thus appeared that a simple yet effective device which needed only to interrupt power to the appliance in the event of its immersion could provide shock protection in a majority of hazardous instances and might be produced at lower cost than, for example, those described in my U.S. Pats. No. 3,997,818 and 4,707,759, which are designed to protect under a very broad spectrum of hazardous conditions.

While many immersion detection circuit interrupter devices have been designed and marketed, it is believed that the present invention more closely approaches the goal of providing maximum effectiveness with minimum cost in order to achieve the most extensive use. The expense of electromagnetic switching devices is avoided, and where solid state devices are employed, their closed mode of failure is made to represent a positive fail-safe factor rather than a negative consideration in the matter of protective functioning. The present invention is particularly rapid in its protection due to a shorting technique which diverts current from the appliance circuit through a low resistance path as it activates the permanent interruption device. It uses very few electronic components and has a simplified construction which is due in part to its single service design. While accidental immersion of an electrical appliance is included in the most hazardous of shock scenarios, such scenarios may be expected to be extremely rare in the course of normal human experience and the expense of making a protective device resettable would appear to be not only superfluous but counterproductive in the attempt to minimize cost, unless a device is prone to the annoyance of unwarranted interruption and thus has a particular need to be made resettable. Safeguards against unwarranted interruption are provided in the present invention and the fast acting fuse link in the interrupter mechanism typically has a current rating far below that of the standard overcurrent devices installed for the protection of branch circuits so that the shorting technique does not result in an interruption of the branch service. However, the rarity of an immersion mishap should prevent such a branch interruption from being considered an aggravation and fuse links designed to permit use with appliances having greater current demands may become permissible.

SUMMARY OF THE INVENTION

In one aspect, this invention is seen to comprise a power circuit having at least two conductors for conducting electrical power from a line source to an appliance circuit, within an appliance housing, and having an electrical shock protection device. The improvement in the device includes an automatic means connected to the conductors to initiate an overcurrent in response to an immersion of the appliance circuit in water or other conductive liquid. The power circuit also includes interrupting means, in at least one of the conductors, that is responsive to the overcurrent to open the one conductor and interrupt the power circuit in event of such immersion.

In other aspects, the automatic means is employed to initiate the overcurrent and includes a sensing conductor and immersion detection circuit. The automatic means provides the overcurrent by establishing a short or low resistance shunting of the appliance circuit. The interrupting means in the conductors has at least one fuse link in one of the at least two conductors.

Preferably, the interrupting means includes normally open electrical contacts which are held closed to complete the power circuit in another of the at least two conductors, by the fuse link through a mechanical coupling that electrically isolates the fuse link from the contacts. The contacts are released to open upon the opening of the fuse link so that at least two of the at least two conductors are opened substantially simultaneously in response to an immersion of the appliance circuit.

An object of this invention is to provide an especially rapid immersion detection and power interrupting shock protective response in a device that can be made an integral part of appliance design.

Another object is to provide an improved immersion detection circuit interrupter (IDCI) that can be produced at minimal cost in order to make such integral shock protection, in the event of immersion, more generally acceptable to the maker, seller and purchaser.

Still another object is to provide a circuit interrupter in a compact package, so that design factors will not be a reasonable argument against acceptance of its integral shock protection by maker, seller or purchaser.

An additional object is to provide an immersion detection circuit interrupter that will function over a wide range of input voltages and frequencies so that the same type of device may enjoy wider usage.

A further object is to provide an immersion detection circuit interrupter device that is not reduced in protective function by the plug of the cord set being inserted into a receptacle outlet having its ungrounded and grounded neutral connections reversed.

A still further object is to provide an immersion detection circuit interrupter that is resistive to the effects of both physical abuse and transient electrical conditions that might cause an unwarranted power interruption.

One more object is to provide an immersion detection circuit interrupter with a mode of failure that leaves an appliance safe to handle, in the event of protective failure, and incapable of being used when no protection can be provided.

BRIEF DESCRIPTION OF THE DRAWINGS

This invention, both as to its organization and principles of operation, together with further objects and advantages thereof, may be better understood by reference to the following detailed description of the embodiment of the invention taken in conjunction with the accompanying drawings in which:

FIG. 1 is a schematic diagram showing the sensor conductor and the immersion detection circuit located in the appliance housing as part of the appliance circuit and the interrupting device located in the plug assembly.

FIG. 2 is a schematic diagram showing the immersion detection circuit located in the plug assembly with the interrupting device and the sensor conductor extended to the appliance circuit as a third conductor in the line cord.

FIG. 4 and FIG. 5 are opposite side views and FIG. 6 is an end view of the same interrupter device.

FIG. 7 and FIG. 8 are side and end views respectively, of the plug housing that contains the interrupter device.

DESCRIPTION OF THE PREFERRED EMBODIMENTS

Figure 3:
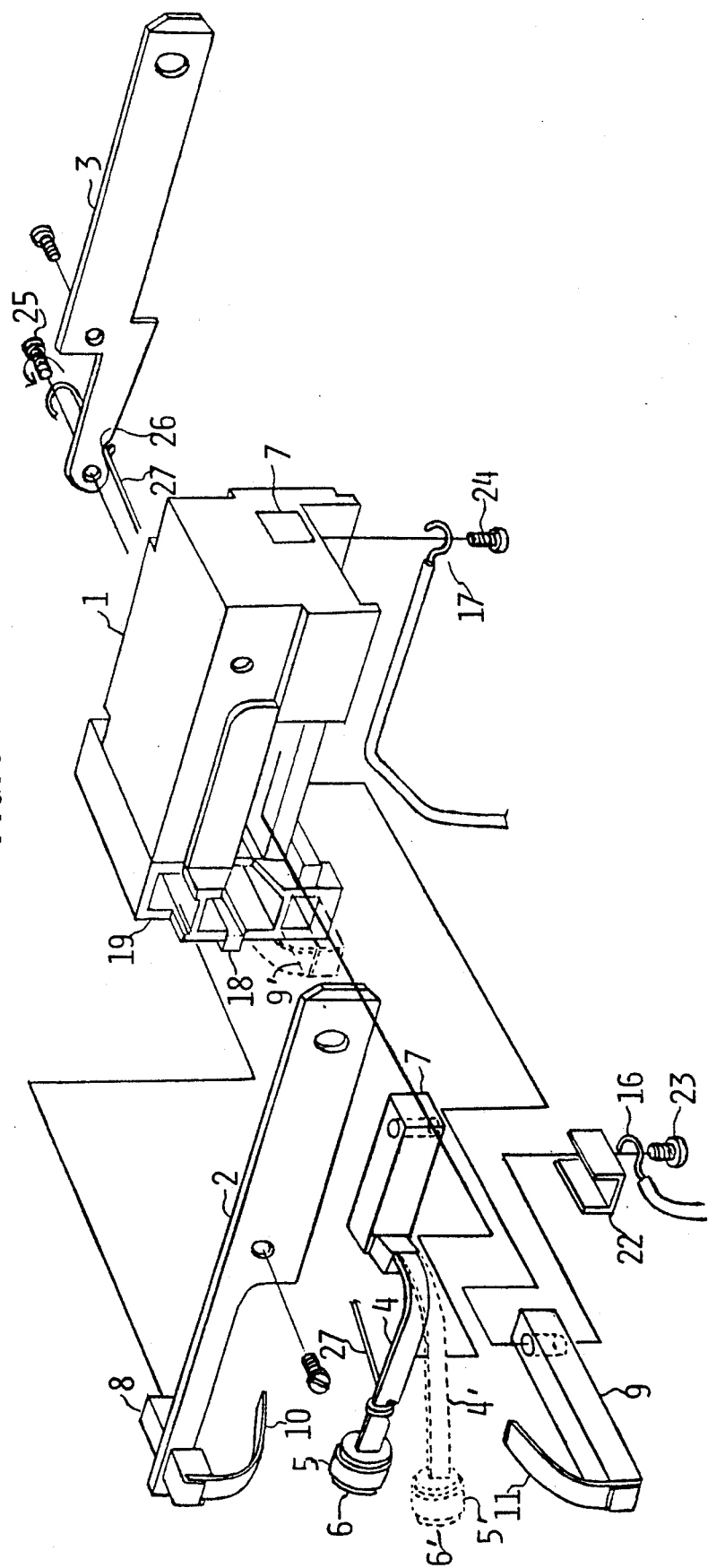
FIG. 3 is an exploded view of the interrupter device contained in the plug assembly.

Referring first to the schematic diagrams of FIG. 1 and FIG. 2, it may be seen that power is supplied from line source 50 through ungrounded conductor 51 and grounded neutral conductor 52 and their respective receptacle terminals 53 and 54 to respective plug blades 3 and 2. From ungrounded plug blade 3 to the appliance load 58 contained in appliance housing 56, the current path may be seen to include a fuse link 27, a spring support strip 4 to which the link is attached, conductor 17 of line cord 15 and appliance switch 57. From grounded neutral plug blade 2 the current path to the appliance load 58 may be seen to include spring contact strips 10 and 11 connected by bridging contact 5 which is carried on the end of fuse support strip 4 but is electrically isolated from it by insulating sleeve 6. From spring contact strip 11 the path continues to appliance load 58 through conductor 16 of line cord 15.

It may also be seen that the detection circuit in both FIG. 1 and FIG. 2 includes a full-wave rectifier 59 which has its a.c. input terminals connected across conductors 16 and 17 so as to be connected in parallel with appliance load 58 together with its controlling switch 57.

Thyristor 60, shown as a silicon controlled rectifier (SCR), is connected across the output terminals of full-wave rectifier 59 so as to pass output current from the rectifier when triggered and placed in a forward conductive state. The full-wave rectifier 59 together with the thyristor 60 will thus pass current in either direction between ungrounded conductor 17 and grounded neutral conductor 16 to shunt or divert current away from appliance load 58 and its switch 57, to short circuit the power path and create an overcurrent which opens the fuse link of the interrupter and releases the bridging contact to interrupt electrical connection to both the ungrounded and grounded neutral sides of the line.

Triggering of the thyristor 60, by immersion, is accomplished through sensor conductor 62 which is connected to the gate of the thyristor, either directly or through optional current limiting resistance 63. When a small current is caused to pass between the sensor conductor and current carrying parts of the appliance or between the sensor conductor and earth ground, as by the connecting contact of water or other conductive medium, the thyristor 60 is triggered and creates the short circuit of the power circuit that activates the interrupter.

Capacitor 61 is connected in parallel with thyristor 60 as a primary means of inhibiting unwarranted triggering of the thyristor by line transients, supplying a small forward conditioning current. It is connected in a filter capacitor position but employs values far lower than those used for filtering purposes. 0.47 to 1.0 mfd is sufficient and values above 2.0 mfd are generally not desirable. Values as low as 0.1 perform efficiently once the plug is inserted in its receptacle and the capacitor becomes charged, but the larger values are needed to increase triggering resistance to the waveform spike often generated when the plug is inserted. An additional method of inhibiting unwarranted triggering, by switching spikes and the like, involves plug blade structure and will be discussed with reference to the mechanical drawings.

Selection of gate sensitivity is also of prime importance in the avoidance of unwarranted triggering of thyristor 60. The Igt should be in excess of 200 microamperes and preferably above 1 milliampere.

Where especially compact circuits are desired the thyristor is typically a 0.8 ampere SCR in a TO-92 package with an insensitive gate. The full-wave rectifier is rated at 1.5 amperes. While these should be considered sacrificial, the fuse action is fast and the rectifier may often survive. In circuits using components with higher surge ratings both components may survive, although the interrupter is not intended for reuse.

Referring now to FIG. 3, we see an exploded view of the interrupter as contained in a prototype plug and we can more readily see how the ring shaped bridging contact 5 is carried at the end of the fuse link supporting spring strip 4, while being electrically isolated from it by insulating sleeve 6. This spring strip, as well as spring strips 10 and 11 are preferably formed of tempered beryllium copper. The base of spring strip 4 is secured in post 7 which is mounted in the interrupter body 1 so that terminal screw 24 can be used to attach line cord conductor 17.

One end of the fuse link 27 is secured, preferably by soldering, to the spring strip 4, which not only connects fuse link 27 to line cord conductor 17 but applies a small amount of tension to the link once its other end has been properly attached to the base of plug blade 3 by using terminal screw 25 or by clamping in slot 26. Plug blade 3 is the narrower of the two blades 2 and 3 and is designed for contact with the ungrounded side of the line in a polarized receptacle.

Spring contact strip 10 has its support post 8 connected directly to plug blade 2 which is the wider one and intended for connection to the grounded neutral side of the line in a polarized receptacle outlet. Oppositely curving spring strip 11 is connected to conductor 16 of the line cord 15 through its support post 9 and terminal screw 23. Strips 10 and 11 connect the grounded neutral side of the line to the load when bridging contact 5 is held in position by spring strip 4 which is retained by fuse link 27.

Strips 10 and 11 have much less curve in the unstressed condition shown in FIG. 3, but are prestressed by curving them further and inserting them in interrupter body 1 where their free ends press against insulative spacing barrier 18 which separates them. While the prestressed degree of curvature, shown in FIGS. 4 and 5, could be provided in unstressed strips, prestressing against the barrier assures a development of high contact pressure with less movement of the bridging contact and also helps assure a positive positioning of the strips.

The nature of the interaction between the strips 10 and 11 is such that insertion of the bridging contact between them is resisted by a force that is initially great and subsequently diminished. Conversely, once the contact is fully inserted, the force of ejection exerted on the bridging contact is small and becomes subsequently greater as it is ejected. As contact 5 is inserted further, a point can be reached in which ejection force approaches zero. At or near this point, the fuse supporting strip can maintain the connecting position of the contact it carries without adverse additive effect on the tension of the fuse wire. Insertion of the bridging contact beyond this point can result in the development of force in a direction that tends to resist rather than assist in its removal. The spacing barrier 18 that separates the ends of the inwardly curving strips is also positioned to act as a stop for bridging contact 5 and prevent excessive insertion.

As a matter of convenience in assembly, final connection of the fuse link 27 to plug blade 3 is not made until bridging contact 5 has been properly pressed into position between the oppositely and inwardly curving strips 10 and 11,thus bringing fuse link supporting strip 4 into a proper position. The bridging contact is then held against its positioning stop 18, fuse link 27 is lightly pulled to straighten it, and then it is fastened to blade 3, preferably by clamping in slot 26, while exerting only enough tension to eliminate a curvature in the link which could affect its rating.

when the fuse link 27 opens the ungrounded side of the line, its supporting spring strip 4 is released and urges the ejection of the bridging contact 5 from the space between curving strips 10 and 11 to open the other side of the line. As the bridging contact 5 is urged toward ejection, by the released link supporting spring strip 4, additional force of ejection is applied by the inwardly curving spring contact strips 10 and 11 in a rapidly increasing amount so that ejection can appear almost explosive in nature. Since the curving strips 10 and 11 and bridging contact 5 also comprise a double break contact arrangement, interruption of current is enhanced.

Close attention should be given to design of the interrupter body 1 to assure that the fuse link 27 is well contained in a shielding and insulating compartment that can also safely direct any escaping material, since the link will more often vaporize than separate and brief but strong arcing between elements of opposite polarity can often occur in the vaporizing metal if short paths are made available.

The mechanical components 4, 5, 6, 10 and 11 which could apply strain to fuse link 27 have low inertial qualities that contribute to the interrupter's resistance to premature rupture of the fuse link that might be caused by dropping the plug on a hard surface or other such physical abuse.

FIG. 4 and FIG. 5 show opposite side views and FIG. 6 shows an end view of the interrupter shown in FIG. 3.

FIG. 7 shows a side view and FIG. 8 shows an end view of plug housing or enclosure 12 with its removable back cover 13 that is made to extend beyond the housing to form a convenient plug-pulling finger grip, and also shows strain relief 14 for line cord 15.

In FIGS. 3, 4, 5 and 7 it can be noted that the plug blades are of the unequal width required for polarizing, but also that they are of unequal length, a simple modification that appears to be useful in avoiding unwarranted interruptions.

I have noted, while testing for resistance of the invention to unwarranted interruption, and using a sensitive SCR without the capacitor protection to achieve a "worst case" condition, that breaking and remaking the power connection on the ungrounded side of the line while the grounded neutral side remained connected, causes triggering of the SCR with far greater frequency than when the arrangement is reversed. When making and breaking the power connection on the grounded side while the ungrounded side remained connected, triggering was very seldom. This effect is apparently due to a component conditioning effect resulting from the feeble currents created by an earth ground capacitance.

The longer blade 3 (just below the maximum allowable length), contacts the ungrounded side of the line and enables the power circuit to be energized with respect to the earth ground capacitance effect just prior to the contact of the shorter blade 2 (just above the minimum allowable length), with the grounded neutral side of the line which completes the power circuit. While the time differential is small it appears to be effective in most test instances.

Even if marginal in reliability due to uncontrollable variables, such as speed of plug insertion, it is a plus factor that can enhance the other means and can be included at zero or near zero cost.

While this invention has been described with respect to certain specific embodiments, it will be appreciated that many modifications and changes may be made by those skilled in the art without departing from the inventive concepts or spirit of the invention. It is intended therefore, by the appended claims, to cover all such modifications and changes as fall within the true scope of the invention.

What is claimed as new and what is desired to be secured by Letters Patent of the United States is:

1. In a power circuit for supplying electrical power from a source through at lest a pair of conductors to utilization quipment and including an overcurrent responsive circuit interruption means, the improvement wherein said interruption means includes a fuse link and an electrically conductive spring, said fuse link and spring being physically and electrically connected through at least one common connection point with said fuse link and spring being in series with one of said one conductor to conduct electrical power from a source through said conductors to utilization equipment, electrical means in series with another of said conductors to interrupt electrical power from said source through said another conductor, said fuse link being physically connected to and electrically isolated from said electrical means to maintain electrical conduction through said another conductor until said fuse link is opened by overcurrent, said fuse link interrupting conduction through said one conductor and causing interruption of conduction through said electrical means in series with said another conductor.

2. In a power circuit for supplying electrical power from at least two conductors to an appliance circuit having an electrical shock protection device including an immersion sensing conductor in a housing of an appliance which is connected to a detection circuit including a current interruption mechanism controlled by said detection circuit to interrupt power to an appliance circuit due to an accidental immersion or the like of an appliance into water or other conductive liquid, the improvement comprising a fuse line and an electrically conductive spring physically and electrically connected through at least one common connection point with said fuse link and spring being in series and forming a part of said interruption mechanism for completing a current path in one said conductor, said fuse link being opened by excessive current through one of said conductors, said interruption mechanism including openable means in another of said conductors to complete and open an electrical path therethrough, said fuse link being electrically isolated from and mechanically linked to said openable means to maintain said openable means operative to complete an electrical path through said other conductor, said openable means being opened substantially immediately upon opening of said fuse link so that it no longer maintains said openable means operative to complete an electrical path through said other conductor.

3. In a power circuit including at least two conductors for conducting electrical power from a line source via an electrical shock protection device to an appliance circuit within a housing, the protection device including an automatic means connected to the conductors to initiate an overcurrent in response to an immersion of an appliance circuit in water or other conductive liquid, the protection device further including interrupting means in at least one of the conductors responsive to the overcurrent to open the at least one conductor and interrupt the power circuit in the event of such immersion, the automatic means including an immersion sensing conductor and immersion detection circuit to activate the automatic means to provide the overcurrent by shorting means for establishing a low resistance shunting of the appliance circuit, the improvement wherein said immersion sensing conductor and immersion detection circuit are located in said housing together with the appliance circuit, an electrical plug housing, said two conductors being connected between said plug and the appliance circuit, said interrupting means being located in said plug housing wherein said interrupting means further includes at least one fuse link and a spring loaded strip, said fuse link and said strip being physically and electrically connected through at least one common connection point.

4. The power circuit of claim 3 wherein said spring loaded strip is formed of conductive spring material.

5. The power circuit of claim 3 wherein said interrupting means includes normally open electrical contacts maintained closed to complete the power circuit in another of the at least two conductors by said fuse link through a mechanical coupling that electrically isolates said fuse link from said contacts, said contacts being released to open upon opening of said fuse link so that the at least two conductors are opened substantially simultaneously in response to an immersion of the appliance circuit.

6. The power circuit of claim 5 wherein said contacts include a pair of spaced contacts closed by a third bridging contact which is carried by said spring loaded strip to form double break contacts.

7. The power circuit of claim 6 wherein said spring loaded strip is maintained in a position by said fuse link with said bridging contact in engagement to and between said pair of contacts until released by the opening of said fuse link.

8. The power circuit of claim 7 in which said pair of contacts, closed by said bridging contact, applies a force to said bridging contact when released by said opening of said fuse link which force is in addition to a force applied to said bridging contact by said spring loaded strip that is released by the opening of said fuse link.

9. The power circuit of claim 5 wherein said contacts include a pair of spaced contacts closed by a third bridging contact which is carried by said spring loaded strip to form double break contacts.

10. The power circuit of claim 9 wherein said pair of elongated strips is curved into a space between said strips.

11. The power circuit of claim 9 further including an insulating barrier, said pair of elongated strips being self biased toward each other and maintained in a spaced position by said insulating barrier located between said strips.

12. The power circuit of claim 3 further comprising a cord set including a line cord, and plug assembly connected to said line cord, said interrupting means being included in said plug assembly.

13. The power circuit of claim 12 further comprising means to inhibit unwarranted activation of said automatic means by line transients generated by insertion of said plug into a receptacle outlet, said means to inhibit including polarization of said plug by forming its blades in unequal widths and unequal lengths with the narrower blade, for contacting an ungrounded conductor from said power source, being longer than the wider blade, for connecting to a grounded conductor from said power source, whereby insertion of said plug into a receptacle outlet will cause connection of said power circuit to an ungrounded conductor prior to connection to a grounded conductor.

14. The power circuit of claim 12 wherein said line cord is only two conductors.

15. The power circuit of claim 3 wherein said interrupting means includes a fuse link connected to a conductive spring strip in series with said one conductor.

16. In a power circuit including at least two conductors for conducting electrical power from a line source, via an electrical shock protection device to an appliance circuit within a housing, the protection device including an automatic means connected to the conductors to initiate an overcurrent in response to an immersion of an appliance circuit in water or other conductive liquid, the protection device further including interrupting means in at least one of the conductors responsive to the overcurrent to open the at least one conductor and interrupt the power circuit in the event of such immersion, the automatic means including an immersion sensing conductor and immersion detection circuit to activate the automatic means to provide the overcurrent by shorting means for establishing a low resistance shunting of the appliance circuit, said interrupting means having at least one fuse link in one of said at least two conductors, said interrupting means further including normally open electrical contacts which are held closed to complete the power circuit in another of said at least two conductors, by said fuse link through a mechanical coupling that electrically isolates said fuse link from said contacts, said contacts being released to open upon the opening of said fuse link so that at least two of said at least two conductors are opened substantially simultaneously in response to an immersion of said appliance circuit, the improvement wherein said fuse link is electrically at one end in series to a conductive spring loaded strip, said contacts including a third bridging contact and a pair of spaced contacts closed by said bridging contact which is carried by said spring loaded strip to form a double break contact arrangement.

17. The power circuit as defined in claim 16 in which said pair of contacts is made of conductive spring material in the form of a pair of elongated strips.

18. The power circuit as defined in claim 17 in which said pair of elongated strips is curved into the spaces between said strips.

19. The power circuit as defined in claim 18 further including an insulation barrier, said pair of elongated strips being self biased toward each other but held in a spaced position by said insulating barrier located between said strips.

20. The power circuit as defined in claim 16 in which said spring loaded strip is held in a position by said fuse link with said bridging contact in engagement to and between said contact pair until released by the opening of said fuse link.

21. The power circuit as defined in claim 20 in which said pair of contacts, closed by said bridging contact applies a force to said bridging contact when released by the opening of said fuse link that is in addition to the force applied by said spring loaded strip that is released by the opening of the fuse link.

22. In a power circuit including at leas two conductors for conducting electrical power from a line source via an electrical shock protection device to an appliance circuit located within a housing, the protection device including an automatic means connected to the conductors to initiate an overcurrent in response to an immersion of an appliance circuit in water or other conductive liquid, the protection device further including interrupting means in at least one of the conductors responsive to the overcurrent to open the at least one conductor and interrupt the power circuit in the event of such immersion, the automatic means including an immersion sensing conductor and immersion detection circuit to activate the automatic means to provide the overcurrent by shorting means for establishing a low resistance shunting of the appliance circuit, the improvement wherein said interrupting means includes at least one fuse link, said fuse link being physically and electrically connected at one end via a conductive spring loaded strip in electrical series with at least one conductor.

23. The power circuit of claim 22 wherein said interrupting means is located in a plug assembly of a line cord set which also includes a line cord between said plug assembly and the appliance circuit located within said housing.

24. The power circuit as defined in claim 23, in which said immersion sensing conductor and said detection circuit are located in said plug assembly, together with said interrupting means and in which said sensing conductor is extended from said plug assembly to said appliance circuit as an additional conductor in said line cord.

25. The power circuit as defined in claim 23, in which said improvement further includes means to inhibit unwarranted activation of said automatic means by line transients generated at the time said plug is inserted into a receptacle outlet, said means to inhibit including the polarization of said of said plug by forming said blades in unequal widths and also including forming then in unequal lengths with the narrower blade, for contacting an ungrounded conductor from said power source, being longer than the wider blade, for connecting to a grounded conductor from said power source so that insertion of said plug into a receptacle outlet will cause connection of said power circuit to an ungrounded conductor prior to connection to a grounded conductor.

26. The power circuit of claim 22 wherein said immersion sensing conductor and immersion detection circuit are located in said housing.

27. The power circuit of claim 22 wherein said immersion sensing conductor and said immersion detection circuit are located in said plug assembly together with said interrupting means, and wherein said sensing conductor is a single conductor extended from said plug assembly to said appliance circuit as an additional conductor in said line cord.

28. The power circuit as defined in claim 22 in which said interrupting means includes normally open electrical contacts which are held by closed to complete the power circuit in another of said at least two conductors, by the said fuse link through a mechanical coupling that electrically isolates said fuse link from said contacts, said contacts being released to open upon the opening of the fuse link so that at least two of said at least two conductors are opened substantially simultaneously in response to an immersion of said appliance circuit.

29. The power circuit as defined in claim 28, in which said immersion sensing conductor and detection circuit are located in said housing together with said appliance circuit.

30. The power circuit as defined in claim 28 further comprising a cord set including a line cord, and plug assembly connected to said line cord, said interrupting means being included in said plug assembly.

31. The power circuit as defined in claim 22 in which said shorting means includes means to inhibit triggering of said thyristor by transient conditions other than immersion of said appliance circuit.

32. The power circuit as defined in claim 31 in which said means to inhibit triggering includes a capacitor connected in parallel with said thyristor.

* * * * *